United States Patent
Ioffe et al.

(10) Patent No.: US 9,118,843 B2
(45) Date of Patent: Aug. 25, 2015

(54) METHODS AND SYSTEMS FOR CREATING SWIVEL VIEWS FROM A HANDHELD DEVICE

(71) Applicants: Sergey Ioffe, Mountain View, CA (US); Christian Frueh, Mountain View, CA (US)

(72) Inventors: Sergey Ioffe, Mountain View, CA (US); Christian Frueh, Mountain View, CA (US)

(73) Assignee: Google Inc., Mountain View, CA (US)

(*) Notice: Subject to any disclaimer, the term of this patent is extended or adjusted under 35 U.S.C. 154(b) by 344 days.

(21) Appl. No.: 13/743,439

(22) Filed: Jan. 17, 2013

(65) Prior Publication Data

US 2014/0198178 A1 Jul. 17, 2014

(51) Int. Cl.
*H04N 7/18* (2006.01)
*H04N 5/247* (2006.01)
*G11B 27/10* (2006.01)

(52) U.S. Cl.
CPC ............. *H04N 5/247* (2013.01); *G11B 27/10* (2013.01)

(58) Field of Classification Search
CPC ......... H04N 5/247; G11B 27/02; G11B 27/10
USPC .............. 348/36–39, 43, 51, 222.1, 239, 262; 345/474, 420, 424, 427
See application file for complete search history.

(56) References Cited

U.S. PATENT DOCUMENTS

| | | | | |
|---|---|---|---|---|
| 6,251,566 B1 * | 6/2001 | Brosh et al. | | 430/321 |
| 7,574,381 B1 * | 8/2009 | Lin-Hendel | | 705/26.9 |
| 2002/0105529 A1 * | 8/2002 | Bowser et al. | | 345/629 |
| 2003/0025725 A1 * | 2/2003 | Nie et al. | | 345/719 |
| 2004/0227751 A1 * | 11/2004 | Anders | | 345/419 |
| 2004/0252205 A1 * | 12/2004 | Onoda | | 348/231.3 |
| 2005/0273830 A1 * | 12/2005 | Silver et al. | | 725/105 |
| 2008/0152199 A1 * | 6/2008 | Oijer | | 382/118 |
| 2011/0169963 A1 | 7/2011 | Winkler | | |
| 2011/0273542 A1 | 11/2011 | Suh | | |
| 2011/0292215 A1 * | 12/2011 | Conley | | 348/159 |
| 2011/0310980 A1 | 12/2011 | Mathew | | |
| 2012/0075284 A1 * | 3/2012 | Rivers et al. | | 345/419 |
| 2012/0123780 A1 | 5/2012 | Gao | | |
| 2012/0147954 A1 | 6/2012 | Kasai | | |
| 2014/0132594 A1 * | 5/2014 | Gharpure et al. | | 345/419 |
| 2014/0195963 A1 * | 7/2014 | Cheung et al. | | 715/781 |

OTHER PUBLICATIONS

PCT International Search Report and Written Opinion, PCT International Application No. PCT/US2013/065822 dated Feb. 17, 2014.

* cited by examiner

*Primary Examiner* — Victor Kostak
(74) *Attorney, Agent, or Firm* — McDonnell Boehnen Hulbert & Berghoff LLP

(57) ABSTRACT

Examples of methods and systems for creating swivel views from handheld video are described. In some examples, a method may be performed by a handheld device to receive or capture a video of a target object and the video may include a plurality of frames and content of the target object from a plurality of viewpoints. The device may determine one or more approximately corresponding frames of the video including content of the target object from a substantially matching viewpoint and may align the approximately corresponding frames of the video based on one or more feature points of the target object to generate an aligned video. The device may provide sampled frames from multiple viewpoints from the aligned video, configured for viewing the target object in a rotatable manner, such as in a swivel view format.

18 Claims, 7 Drawing Sheets

METHODS AND SYSTEMS FOR CREATING SWIVEL VIEWS FROM A HANDHELD DEVICE

BACKGROUND

In computer graphics, three-dimensional (3D) modeling involves generation of a representation of a 3D surface of an object. The representation may be referred to as a 3D object data model, or simply a 3D model, and can be rendered or displayed as a two-dimensional image via 3D rendering or displayed as a three-dimensional image. Various techniques exist for generating 3D object data models that may be viewed as a two-dimensional image, such as 3D stereo vision or 3D scanning. However, current techniques may have limitations and/or may involve expensive equipment that requires a high degree of precision. An alternative way to provide a user with a 3D experience is the creation of swivel views, such as a collection of two-dimensional images taken around an object that, when browsed through, generate the impression that the object is being rotated. Such swivel views are currently generated through the use of expensive equipment, such as turn tables or robotic arms, used to capture the views of the object from precisely defined angles.

SUMMARY

In one aspect, a method is described. The method may comprise receiving a video of a target object. The video includes a plurality of frames, and the video includes content of the target object from a plurality of viewpoints. The method includes determining one or more approximately corresponding frames of the video including content of the target object from a substantially matching viewpoint, and a first of the one or more approximately corresponding frames is from a first portion of the video and a second of the one or more approximately corresponding frames is from another portion of the video. The method may further comprise aligning the one or more approximately corresponding frames of the video to generate an aligned video, and sampling frames of the aligned video to select frames from multiple viewpoints of the plurality of viewpoints. The method includes providing the sampled frames configured for viewing the target object in a rotatable manner.

In another aspect, a non-transitory computer readable medium having stored thereon instructions that, when executed by a computing device, cause the computing device to perform functions is described. The functions may comprise receiving a video of a target object. The video includes a plurality of frames, and the video includes content of the target object from a plurality of viewpoints. The functions include determining one or more approximately corresponding frames of the video including content of the target object from a substantially matching viewpoint, and a first of the one or more approximately corresponding frames is from a first portion of the video and a second of the one or more approximately corresponding frames is from another portion of the video. The functions may further comprise aligning the one or more approximately corresponding frames of the video to generate an aligned video, and sampling frames of the aligned video to select frames from multiple viewpoints of the plurality of viewpoints. The functions include providing the sampled frames configured for viewing the target object in a rotatable manner.

In still another aspect, a system is described. The system may comprise at least one processor and data storage comprising program instructions executable by the at least one processor to cause the at least one processor to perform functions comprising receiving a video of a target object. The video includes a plurality of frames, and the video includes content of the target object from a plurality of viewpoints. The functions include determining one or more approximately corresponding frames of the video including content of the target object from a substantially matching viewpoint, and a first of the one or more approximately corresponding frames is from a first portion of the video and a second of the one or more approximately corresponding frames is from another portion of the video. The functions may further comprise aligning the one or more approximately corresponding frames of the video to generate an aligned video, and sampling frames of the aligned video to select frames from multiple viewpoints of the plurality of viewpoints. The functions include providing the sampled frames configured for viewing the target object in a rotatable manner.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
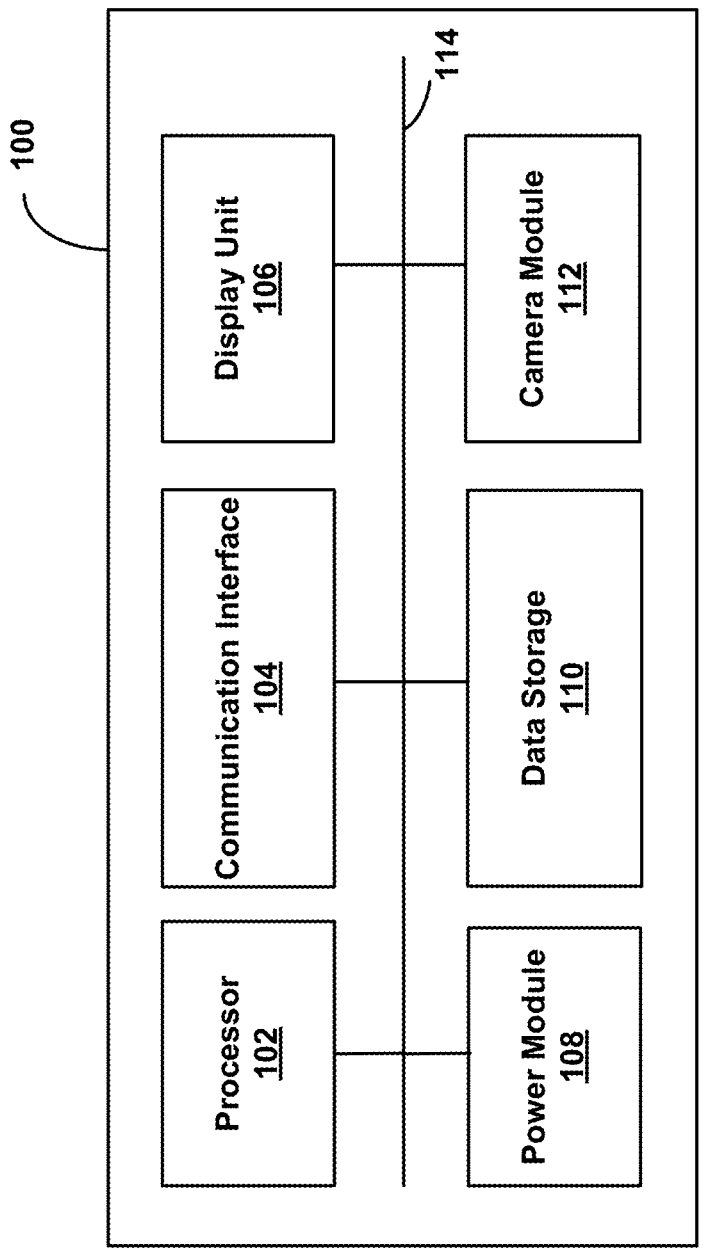
FIG. 1 is a functional block diagram of an example device that may execute the functions described herein.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In one example for creating swivel views from a handheld device, a device may capture and/or receive a video of a target object. The device may be a handheld device, such as a mobile phone or a wearable computing device, for example. The video may include content of the target object from a plurality of viewpoints. Further, the device or another entity may be configured to determine one or more approximately corresponding frames of the video that include content of the target object from a substantially matching viewpoint. The one or more approximately corresponding frames may be from different portions of the video, such as for example one frame from a beginning of the video and one frame from an end of the video. In addition, the device or another entity may be configured to align the one or more approximately corresponding frames of the video based on feature points of the target object so as to generate an aligned video. For example, the corresponding frames may include frames of matching content, matching positions of objects, the device matching edges of frames for frames with edges of the same content, etc. Using the aligned video, the device or another entity may sample frames to select frames from multiple viewpoints of the plurality of viewpoints and provide the sampled frames configured for viewing the target object in a rotatable manner.

Furthermore, in some instances, the video comprising a plurality of viewpoints captured by a device may include one or more viewpoints from about 360 degrees around the target object and/or may be composed of frames at approximately evenly spaced degrees of rotation from the plurality of viewpoints. The device or another entity, such as a viewer for example, may be configured for displaying the sampled frames of the target object in a swivel view format. A swivel view format may allow a user to view the target object in a rotatable manner that simulates viewing the object in person. A device may use swivel view format by allowing the ability for the device to display the target object in a rotating fashion, controlled automatically or by a user through dragging the images in a direction. A device using swivel view format may cause a user to perceive the target object from many viewpoints, such as a full circle showing all the angles of the target object.

Additionally, the device or entity may use one or more feature points of the target, which may include distinct pixels capable of being tracked across the plurality of frames. Further, in some examples, the device or entity may be configured to determine one or more transformation parameters applicable to adjust the video to be substantially focused on the target object (e.g., by utilizing the amount of movement of the feature points in order to determine which feature points correspond to the object and which feature points correspond to the background). The device may also generate additional sampled frames to be used to view the target object in a swivel view format. A device using swivel view format may be capable of showing the target object from some or all the angles around a target object, such as from a perspective circling full 360 degrees around the target object.

Systems, methods, and devices in which examples may be implemented will now be described in greater detail. In general, described methods may be implemented by various types of computing devices or components of the devices. In one example, a system may include one or more servers, which may receive information from and/or provide information to a device, such as a mobile phone. However, the described methods may also be implemented by other computing devices, such as a personal computer, a wearable computing device, or a mobile device, among others. Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

FIG. 1 is a functional block diagram of an example device 100 that may execute the functions described herein. For example, a device 100 may be a mobile phone, wearable computing device, computing device, handheld device or a tablet computer, etc. In the example, the device 100 comprises a plurality of components. In some examples, the device 100 may comprise more or less components and the components may be combined or split into more components.

In addition, the components of device 100 may be distributed across multiple devices. Other example functional block diagrams may exists as well.

In the example illustrated by FIG. 1, the device 100 comprises a processor 102, a communication interface 104, a display unit 106, a power module 108, data storage 108, and a camera module 112. Further, the components within device 100 may be linked by a communication link 114. The device 100 may additionally comprise various hardware or software elements not discussed herein.

The processor 102 may be configured to execute the various functions and methods described herein. Similarly, the processor 102 may execute other functions or methods and may also be configured to carry out the instructions of one or more computer programs. In some instances, the processor 102 may be configured to communicate with other components within the device 100 via a communication link 114.

The communication interface 104 may be configured to enable the device 100 to communicate with one or more devices, such as a mobile phone, computing device, or a server, etc. In addition, the communication interface 104 may be configured to send/receive input data between one or more components and one or more devices. In some examples, the communication interface 104 may be configured to maintain and manage records of data sent/received by the device 100. Further, the communication interface 104 may be configured to receive input from one or more users. The communication interface 104 may use buttons, a touchscreen, microphone, motion sensor, or other means to receive input from a user.

Along with a processor 102 and a communication interface 104, the device 100 may further comprise the display unit 106. The display unit 106 may be one or more screens to provide a display to a user. In some examples, the display unit 106 may be configured to execute in real-time. In addition, a display unit 106 may be configured as a projector to project images upon a separate entity. In some examples, a device 100 may comprise a display unit 106 and/or be configured to display images on an external screen or entity via a wireless or wired connection. The display unit 106 may also be able to receive input from a user via a touchscreen.

The power module 108 may provide power for the device 100 to execute methods and functions. The power module 108 may be comprised of one or more batteries. In addition, the power module 108 may be configured to receive power via a wire or wireless provider and may be able to convert power between alternating current "(AC)" and direct current "(DC)". The power module 108 may provide power to the components within the device 100 and may provide power to external entities, for example.

The data storage 110 may comprise volatile or non-volatile types of memory and may be configured with different types of mutability. In some implementations, the data storage 110 may store program logic, functions, or other information that may be executed by the processor 102. Additionally, the data storage 110 may store reference data and other components.

The camera module 112 may comprise one or more cameras that may be configured to operate in real-time. The camera module 112 may be capable of capturing images and/or may be configured to capture videos. In addition, the camera module 112 may be configured to adjust features based on lighting, environment, or other elements, for example.

The example in FIG. 1 further shows the device 100 comprising the communication link 114. The components within the device 100 may be connected or linked via the communication link 114. The communication link 114 is illustrated as a wired connection; however, wireless connections may also be used. For example, the communication link 114 may be a wired serial bus such as a universal serial bus or a parallel bus. Similarly, a wired connection may be a proprietary connection as well. Likewise, the communication link 114 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee standard technology, among other possibilities.

Figure 2:
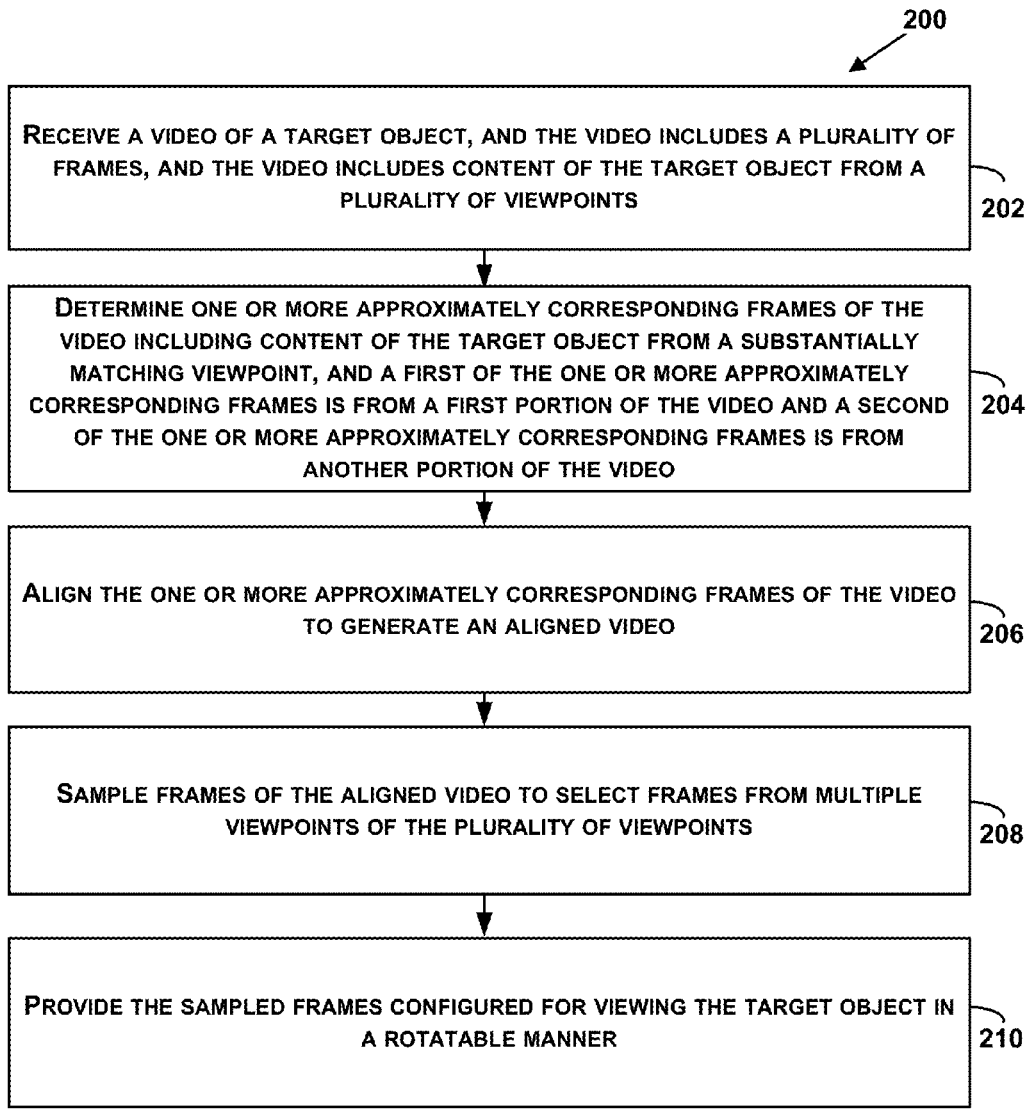
FIG. 2 depicts a flow chart of an example method for generating a swivel view with a device.

FIG. 2 depicts a flow chart of an example method. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 200 shown in FIG. 2 will be described as implemented by a device, such as a handheld device, in communication with other devices and/or servers. It should be understood that other entities can implement one or more steps of the example method.

At block 202, the method 200 includes receiving a video of a target object, and the video includes a plurality of frames, and the video includes content (e.g., images) representing the target object from a plurality of viewpoints. One or more devices, such as the device 100 in FIG. 1, may be configured to capture one or more videos of a target object, or receive the video of the target object from another device. For example, the device capturing the video of a target object may be a handheld device. The device may include one or more cameras that may be used to capture video or images of the target object. In addition, the target object may be any entity, such as a mobile phone, building, and car, for example. Similarly, the target object may be in motion, such as an animal moving, or the target object may have other aspects changing such as an appearance or facial expression.

When performing the method 200, a device may capture video from various paths, including circling around the target object. The various paths may enable a device to capture different sides and elements of a target object from different points of view. For example, a user may walk in a circular motion around a target object while using the device to capture video of the target object from different positions or perspectives or may move in a more elliptical shape. Other paths may be used as well, such as rectangular paths, crescent paths, and incomplete circular paths, for example. A device may capture videos from different angles as the device is moved around the target object in different ways. For example, a device may capture video of the top and bottom of the target object and then capture another video of the sides. In addition, the video may be captured by a device at various heights and positions and may be moved manually by the user to different positions to capture the video of the target object or may be configured to automatically move in a path around the target object while capturing video of the target object.

At block 204, the method 200 comprises determining one or more approximately corresponding frames of the video including content of the target object from a substantially matching viewpoint. A first of the one or more approximately corresponding frames is from a first portion of the video and a second of the one or more approximately corresponding frames is from another portion of the video. Approximately corresponding frames may include frames that show a target object from similar perspectives or positions within a predefined threshold configured by the device and/or set by the user. Likewise, approximately corresponding frames may also depend on capturing similar features based on the positioning of the target object within the frames. The device or another entity may be configured to analyze the received video by the individual frames that compose the video in order to determine approximately corresponding frames of the video that include content of the target object from a substantially matching viewpoint. A device may be configured to allow some degree or threshold of difference for a substantially (e.g., within a threshold) matching viewpoint rather than requiring the exact same viewpoint. The substantially matching viewpoints may include the device capturing the video from the same perspective or the frames captured within a certain portion or range of the video, for example. In some examples, the substantially matching viewpoint may be when the target object is in the same position of each frame despite being captured from different viewpoints by the device. The same position may be the position of the target object within the frame, such as whether the object is located in the same corner of each image, or the center of each image.

In addition, the approximately corresponding frames may be determined from different portions of the video. For example, the device or another entity may determine approximately corresponding frames from the beginning, middle, and end of the video. In some examples, the approximately corresponding frames may be determined from uniform intervals throughout the video of the target object or may be selected so a predefined number of portions of the video may be used. For example, the device may determine approximately corresponding frames every thirty seconds from the video.

At block 206, the method 200 further includes aligning the one or more approximately corresponding frames of the video to generate an aligned video. In some examples, the device or another entity may be configured to determine feature points of the target object, which may be defined pixels of the target object in the frames. The one or more feature points of the target object may be capable of being tracked across the plurality of frames of the video by the device or another entity. Examples of feature points may include corners, points of the object made of different materials, intersections, etc. Further, based on an amount of movement of the one or more feature points across the plurality of frames, a device or another entity may be configured to determine one or more transformation parameters applicable to adjust the video to be substantially focused on the target object. Examples of transformations may include calculating an x-y offset, or scaling parameters of the image to adjust a position of the object within the frame. Furthermore, the device may be configured to use a global positioning system "(GPS)" to assist performing any of the steps of method 200. The GPS system may be associated directly with the device or may be linked through communications with another device.

The device may align the approximately corresponding frames so that the target object appears centered throughout the aligned video. For example, the device may be configured to actively determine pairs of the approximately corresponding frames that contain the target object from a similar point of view and place those frames in order when generating the aligned video. Further, in some examples, the device or an entity may alter, scale, or manipulate one or more approximately corresponding frames of the video in various ways to further align the feature points of the target object to generate the aligned video. For example, the device may crop and/or apply perspective or affine transforms to one or more frames to position the foreground and target object so that the frames more closely resemble other frames used to generate the aligned video. Likewise, a device may scale the frame to focus on the target object and thus, reposition the target object relative to the boundaries of the frame. The device may be configured to perform a comparison between frames to determine whether the frames meet a predefined threshold prior to aligning the frames to generate an aligned video. Other examples of aligning the approximately corresponding frames may exist as well.

At block 208, the method 200 further comprises sampling frames of the aligned video to select frames from multiple viewpoints of the plurality of viewpoints. The device that captured the video of the target object or another entity may be configured to sample frames of the aligned video to select frames from multiple viewpoints of the target object. The device may select frames at approximately evenly spaced degrees of rotation from the plurality of viewpoints. A device may be configured to use measuring mechanisms or timers to assist in determining which frames to select at approximately even spaced degrees of rotation from the plurality of viewpoints. Similarly, the device may also use GPS to assist in the process. In one example, a device may capture video of a target object on a turntable or another rotatable entity and may receive information from the turntable, such as position information related to the target object and the device. The device may use the position information to select frames at approximately evenly spaced degrees of rotation. Further, the sampled frames of the aligned video may each show the target object in a similar manner, but from different viewpoints. For example, a device may display one or more sampled frames that display the front of the target object, and may also display one or more sampled frames that display the sides and back of the target object. The device may be capable of allowing the user to select which sampled frames to view.

At block 210, the method 200 additionally comprises providing the sampled frames configured for viewing the target object in a rotatable manner. The device or another entity may be configured to provide a computing device or another entity, which may display the sampled frames to allow one or more users to view the target object in a rotatable manner. In some examples, one or more entities may provide the sampled frames configured for viewing such that a view of the target object is based on a received input to a viewer. A viewer may be a device or another entity capable of displaying the sampled frames to a viewer. The viewer may be configured to receive input from a user, such as touching inputs or voice commands, etc., to switch between the various frames of the target object at different perspectives. In addition, a device or another entity may provide the sampled frames in a configuration for viewing the target object in a swivel view format. The swivel view format may show the target object from some or all the angles of a perspective as if the user was walking around the target object. In some examples, the device may provide the sampled frames configured in a video format that may present the numerous viewpoints to a user as a video.

In some examples, a device may use a plurality of cameras or may communicate with other devices to capture videos of the target object. For example, a plurality of devices may be positioned around a target object and capture video of the target object to share with the other devices. Furthermore, in some examples of executing method 200, the device may be moved in a full rotation of 360 degrees or in a rotation less than 360 degrees around the target device. For example, the device may capture a 90 degree view of the target device. Likewise, a processor in a device may receive the video of the target object from a camera module of the device, or from another device. The video of the target object including a plurality of viewpoints may include viewpoints from about 360 degrees around the target object. In some examples, the device may perform a loop-closing process, which may include detecting that the device has captured video of a target from 360 degrees around that object and comparing the feature points at the starting frames of the video and the end frames. A device may be configured to determine frames and close loops based on the frames automatically. In addition, the device may stabilize the start and end frames relative to each other. Similarly, the device may align frames throughout the aligned video to ensure that frames may match throughout the entirety of the aligned video.

Additionally, in some examples of performing method 200, a device or another entity may be configured to perform one or more additional processes for stabilization. For example, the device may capture video of the target device and stabilize on the target object in the foreground. In some instances, when capturing the video of the target device, the device may capture the foreground and background segmentation. The device may create a binary mask for the background to highlight the target object, which may remove the background that may result from movement. A device may track image features across various sampled frames and group the sampled frames into foreground or background based on the agreement of flow characteristics and/or using a center assumption. The center assumption may be satisfied when the target object is roughly in the center for most of the sampled frames. For example, the device or another entity may cluster features into the foreground and background, further stabilizing based on the foreground. The foreground may contain the target object and the device may be configured to determine based on new features whether or not the features are part of the foreground and the target object or part of the background. For example, the device may determine the foreground through the features that move the least throughout the sampled frames.

In some examples, a device may be configured to determine that the device was moved in various directions during capturing the initial video of the target object. A device may be configured to remove frames determined to be indicative of previous views captured due to back-and-forth motion of the device while recording the video of the target object. Further, the device may be configured to determine motion blur based on each sampled frame individually and may also remove frames determined to contain any indication of blurred motion. In some instances, the device may use a deblurring technique to repair frames that contain indications of blurred motion. For example, a device may remove the blurred motion by estimating the blurred portion from adjacent non-blurred frames.

Furthermore, a device may be configured to remove and/or eliminate frames of the video at the beginning and the end of the video sequence if the frames have substantially different flow characteristics from the average of the sequence. For example, if the end frames move substantially faster or slower than the rest of the frames grouped in the middle portion of the video.

In some examples, a device may determine the sampled frames by using structure-from-motion to compute both sparse 3D points and camera positions for each individual frame. In response, the device can subsample the determined frames based on desired spacing of camera positions. For example, the device may sample based on a predefined degree difference between each camera position. The device may be configured to remove frames that relate to previously determined frames from the same camera position and may also be configured to actively seek for frames based on predicted camera positions. The device may also base decisions on various points of the target object.

In another example, a device may capture a video containing a certain amount of frames, such as 1600 frames, of a target object, which may display excessive amounts of shakiness or other unwanted effects during the video capture. After the device processes the video, the generated aligned video may contain 180 frames with 2 degrees of spacing between the frames from the portions of the original video. The device may determine the degrees of spacing using GPS or measurement tools, for example. The aligned video may comprise the target object always in the relative center of each frame of the aligned video. Further, the device may be capable of displaying the aligned video allowing a user to move the frames to see the various sides of the target object in a rotatable manner. The device may enable the rotation via a touchscreen, voice commands, or another form of input, for example. In addition, the device may provide the aligned video to a viewer that may be capable of allowing the user to see the various viewpoints of the target object in a rotatable manner. The viewer may be configured to show the various viewpoints of the target object at different levels of detail (e.g., allowing zooming in/out on images of the target object). The viewer may execute commands in response to user inputs, such as switching between the various viewpoints or zooming in. In addition, the viewer may save different views of the target object in memory and may use the Internet. Similarly, the device that captured the target device may be capable of placing the aligned video on the Internet for users to view through webpages or other means.

Furthermore, a device or another entity may be configured to make adjustments to variances in environment, lighting, or other factors that may impact the generation of an aligned video. Similarly, a device may be configured to reduce the impact from poor lighting conditions and undesired backgrounds and/or background elements. The device or another entity may compensate for color and/or lighting when capturing the video. For example, a device or another entity may use differences in the foreground and background to segment out a target object and/or may make a background darker, lighter, or more blurry. Likewise, a device may use color balancing to compensate for lighting differences across various frames of the aligned video. Similarly, a device may be configured to perform other visual effects. In addition, the device may remove or reduce any unwanted effects, such as frame image imperfections or shakiness, which may impact the quality of the captured video used to generate swivel views. Through determining and aligning approximately corresponding frames of the video and sampling frames, a device may be able to reduce imperfections caused by unknown camera pose and other imperfections, such as motion jitter, uneven motion, individual frames blurred to camera motion, and unknown start and end time of capturing video of the target object, for example.

In some examples of executing method 200 or similar methods, a device or another entity may use a set of processing algorithms to convert the hand-held video captured around the target object into a set of aligned sampled frames that allow a device or another entity to display the sampled frames in a manner to create the impression of rotating around the target object. The device may be configured to stabilize the video received from the handheld device based on the target object and select a subset of the video frames that particularly represent the different views of the target device from different angles. In addition, the device may process sampled frames to cause the frames to appear more consistent throughout the swivel views. The device may show the various perspectives of the target object from different angles and may allow the user to select among the various perspectives.

Figure 3A:
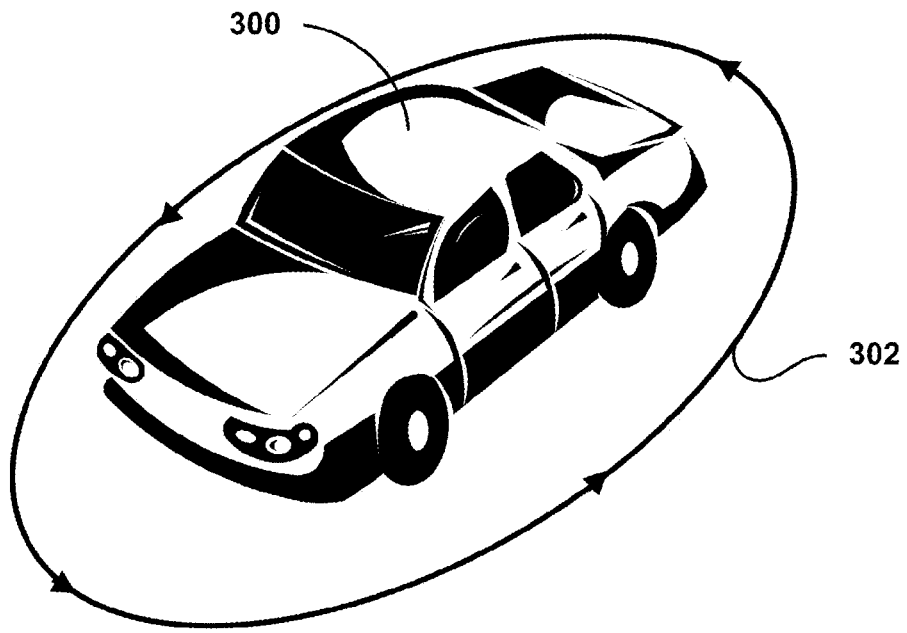
FIGS. 3A-3B illustrate example scenarios in which a handheld device captures a video of a target object.
Figure 3B:
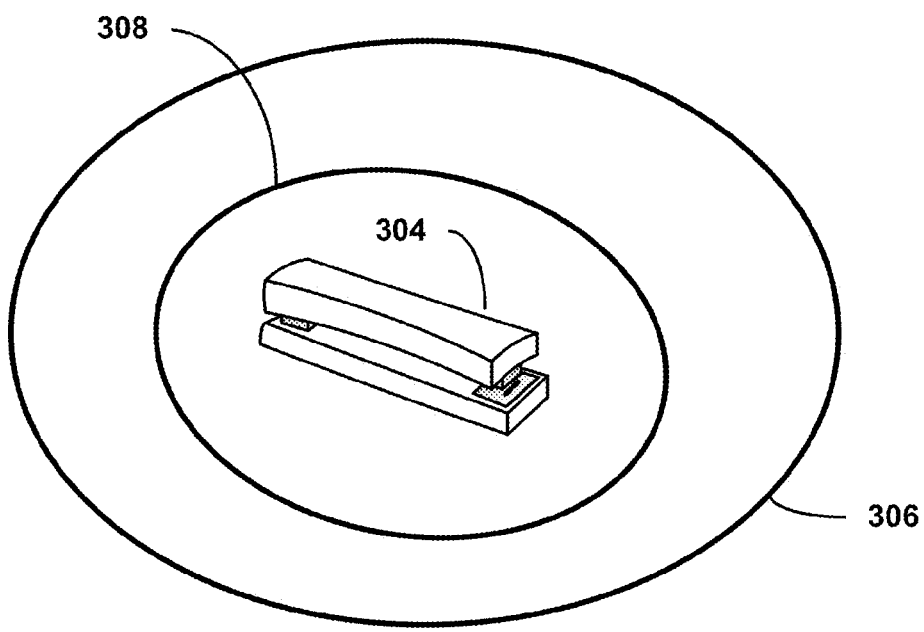

FIGS. 3A-3B illustrate examples of receiving videos of target objects in order to provide sampled frames configured for viewing the target objects in a rotatable manner. FIG. 3A illustrates an example comprising a car 300 as the target object. In other examples, the target object may be a different entity, such as people, objects, other elements, for example. The target object may also be immovable objects, such as trees, buildings, or other entities. In addition, the example further illustrates a path 302 that may represent the path of viewpoints a device may capture the video of the car 300 from. For example, a user may use a mobile phone capable of capturing video and walk around the car 300 along the path 302 shown in the example while recording video. In addition, one or more devices may be configured to move along path 302 while capturing a video of the target object, car 300.

The path 302 represents one potential path that a user may move along while capturing images or videos of the car 300. In some instances, a device may be moved along a path with a greater/smaller radius. Additionally, some paths that a device may be moved along may be more elliptical or more circular overall. Further, the path may not fully encompass the target object and may only focus on a portion of the target object.

The path 302 includes arrows showing a counter clockwise rotation around the car 300. In other examples, a device may use a clockwise rotation around the car 300. In addition, the path 302 may be orientated differently with the target object at different views or angles. In the example illustrated by FIG. 3A, the path 302 is a horizontal path around the car, which captures video of the front of the car 300, the trunk of the car 300, the doors, and wheels of the car 300. In another example, a user may choose to move a device in the motion of a vertical path, which would capture different views of the car, such as the roof of the car 300. Similarly, a user may move the device in a combination of a horizontal path and vertical path and/or may use multiple paths to capture more video to use for generating a swivel view of the car. The device may be used to capture all the different perspectives from different angles of the target object to generate a swivel view format capable of display the car in a rotatable manner.

Since the user may capture video to generate swivel views of a target object without physically repositioning the target object, a wide range of entities may be used as the target object. Other 3-dimensional (3D) modeling approaches that may be used may require expensive capturing environment, and may even require 3D devices, such as scanners, as well. In contrast, a user may select a car 300 in any environment, such as parked in a parking lot, and use a handheld device to capture a video that may be used to provide sampled frames for viewing the target object in a rotatable manner without requiring physically repositioning the car or using expensive 3D devices. The device may be capable of separating the foreground with the car from the environment and any objects within the background.

FIG. 3B illustrates another example comprising a stapler 304 as the target object and also possible paths 306-308 at which a device may capture one of more videos of the target object from. In the example, the target object is a stapler 304, but other entities may be used as the target object in other examples. Further, multiple objects may be used as a target object if a user wishes to display swivel views of the multiple objects as a group from a plurality of views.

The example illustrated by FIG. 3B comprises multiple paths, path 306 and path 308, that a device may be moved along while capturing a video of the stapler 304. In some examples, the example scenario 306 may further include additional paths that a mobile device may be moved along by a user to capture a video of a target object. Further, a device may be configured to move in different directions along the various paths while capturing the video of the target object, stapler 304.

FIG. 4A-4D illustrate example frames of a captured video of a target object. Within FIGS. 4A-4D, each figure shows a different frame that may have been derived from a video captured by a device from various viewpoints of the target object. In the example frames, the target object is a stapler 400a-400d, similar to the example shown in FIG. 3B. Further, the stapler is positioned on a table 402a-402d and shown in the different frames of a video. In some instances, the video may have been captured by a handheld device that was moved around the stapler on the table. Similarly, in a different example, the device may have mechanically moved around the stapler to capture the video of the stapler from different viewpoints.

Figure 4A:
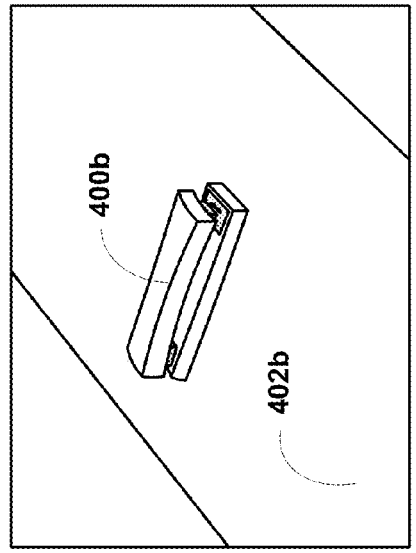
FIGS. 4A-4D illustrate example frames of a captured video of a target object.

Furthermore, the example frames may show that the stapler may not necessarily be located in the center of every frame throughout the video. For example, FIG. 4A shows the stapler 400a in the upper-left corner of the image with only part of the table 402a in the image. The stapler 400a is not in the approximate center of the image. Various reasons may cause the target object to vary position in each frame. For example, while capturing the video, the device may be moved slightly, jittered, uneven motion, or other actions that may affect the level and angle of the camera of the device. In some of the example frames, the stapler may be positioned in the middle of the table and in others, the stapler may have been captured in another position of the frame. Further, the example frames shown in FIGS. 4A-4D may be a small sample of the plurality of frames that compose the video captured by the device and may be determined by a processor within the device or another entity.

Figure 4B:
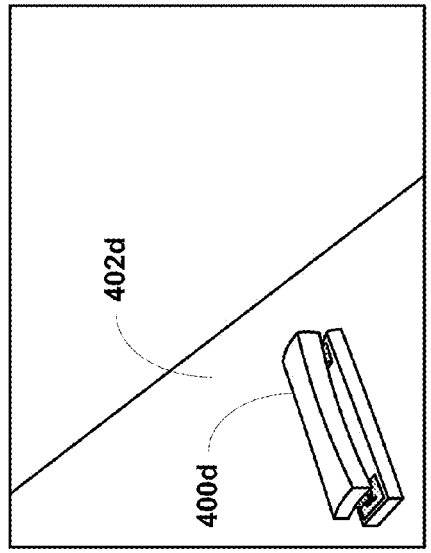
Figure 4C:
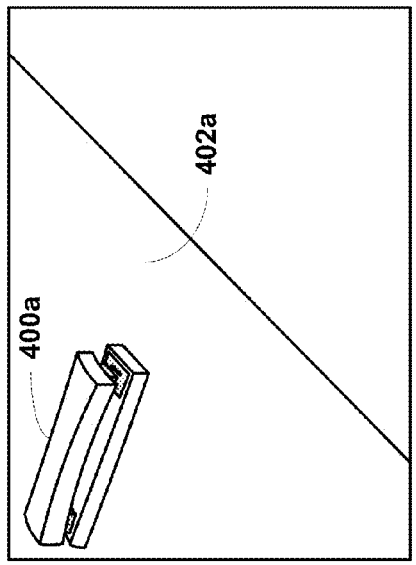
Figure 4D:
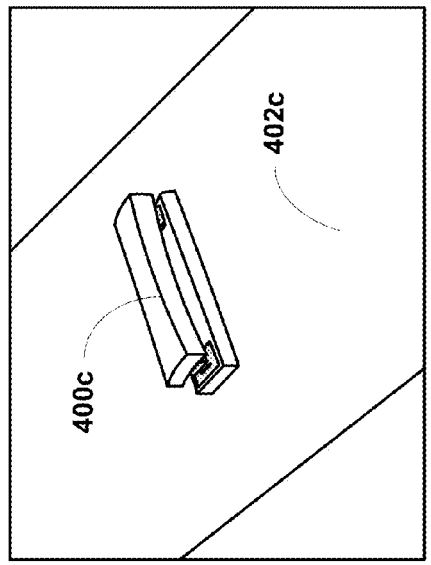

FIG. 4B shows the stapler 400b in the foreground of the frame in the approximate center of the frame. In addition, FIG. 4B shows both of the edges of the table 402b in the background of the frame. The device may decide to use the frame in FIG. 4B for the aligned video since the target object, stapler 402a, is located in the approximate center of the frame. Similarly, FIG. 4C shows the stapler 400c in the foreground and the table 402c in the background, but from a different viewpoint. The device or another entity may be configured to also use the example frame shown in FIG. 4C since the stapler 400c is in the approximate center of the frame. FIG. 4D shows the stapler 400d from the same angle, but not in the approximate center of the frame. In one example, FIG. 4D may be from a similar portion of the video since In some instances, the device may be configured to determine, from the plurality of frames that make up the video, one or more of the frames, such as the example frames in FIGS. 4A-4D, which may approximately match and/or include content of the target object from a substantially matching viewpoint. For example, an entity may determine that FIG. 4B and FIG. 4C may show the target object viewed from viewing positions rotated from each other with respect to the target object. In addition, FIGS. 4C and 4D show example frames that may have resulted from little rotation, but may include a change in elevation or position. The device may be configured to choose one or the other of the frames, both or none of the frames, or make adjustments to the frames. In the same example, the entity may determine that FIG. 4A and FIG. 4D are not approximately corresponding frames since FIG. 4A and FIG. 4D show frames where the stapler is not positioned in the middle of the frame. The entity may decide to remove the frames within FIG. 4A and FIG. 4D prior to aligning the one or more approximately corresponding frames based on one or more feature points of the target object (stapler) to generate an aligned video. The feature points may be any pixels within the frames that represent portions of the target object that a device may easily track or recognize. Further, the device may designate feature points and may be configured to track the designated feature points. The device may use the feature points to identify the various viewpoints and the degrees the device may have rotated around the target object within the captured frames of the video. Similarly, a device may use the feature points to identify the relative viewing position of the device. In some examples, an entity may scale or crop the example frames in FIG. 4A and FIG. 4D to use the frames in addition to the frames in FIGS. 4B and 4C to generate the aligned video. A device may use other means to make a frame usable as well. The aligned video may provide a user with the opportunity to view various frames from multiple viewpoints so as the staple appears to be in three-dimensions.

Figure 5A:
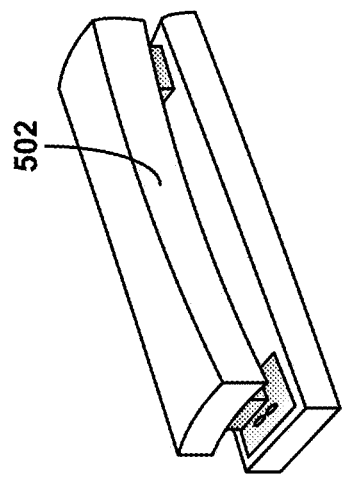
FIGS. 5A-5B illustrate example sampled frames configured for viewing a target object in a rotatable manner.
Figure 5B:
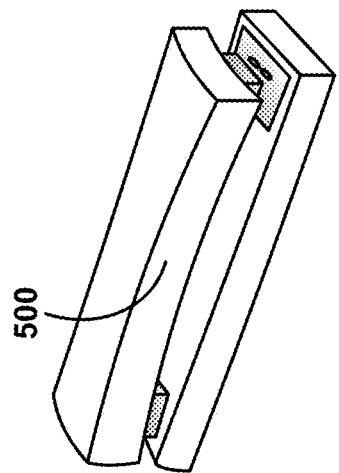

FIG. 5A-5B illustrate example sampled frames configured for viewing a target object in a rotatable manner. Within the FIGS. 5A-5B, the target object is a stapler. FIG. 5A-5B may be a further extension of the example frames shown in FIGS. 4A-4D. In FIG. 5A, the sampled frame shows side 500 of the stapler positioned in the center of the frame. Similarly, in FIG. 5B, the sampled frames show side 502 of the stapler positioned in the center of the frame. Side 500 and side 502 of the stapler are opposite sides of the stapler and may be capable of being viewed by a user on the device or another entity. In addition, a user may be able to view more views from the plurality of views of the aligned video of the stapler in a rotatable manner. FIGS. 5A-5B may be example sampled frames from an aligned video that allows a user to view the stapler in a rotatable manner. The sampled frames may be able to be selected by the user.

Figure 6:
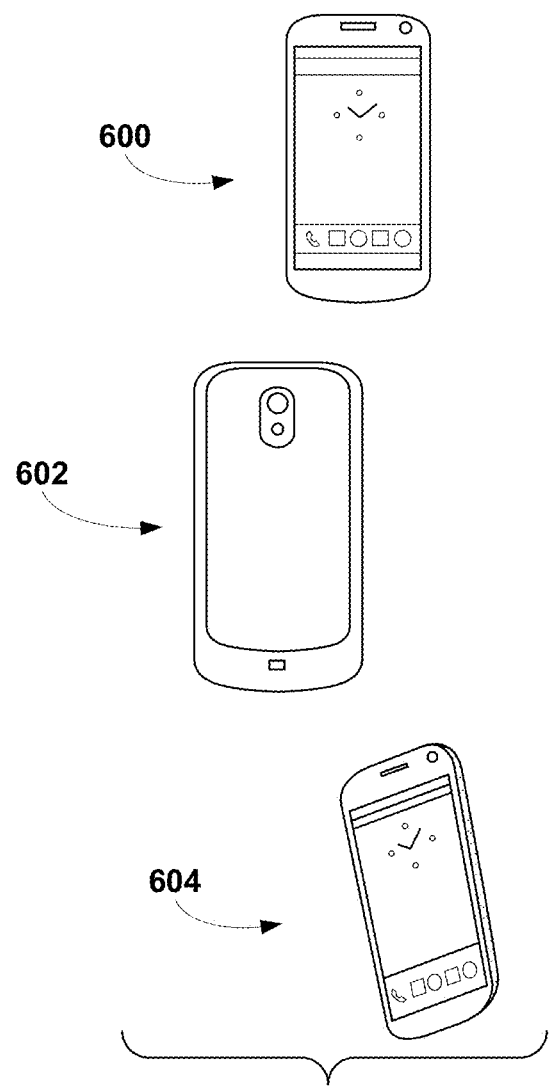
FIG. 6 illustrates an example scenario for determining frames of a video of a target object to use for viewing in a rotatable manner.

FIG. 6 illustrates an example scenario in which a handheld device may be used to capture a video of a target object that may be used to generate a swivel view of the target object. In the example scenario, the target object is a mobile phone, but other example target objects may be used as well. Similar to the other examples shown in the previous figures, a device may be used to capture a video of a much larger entity, such as a car or a building, for example. Likewise, the device may also capture a video of entities smaller than the mobile phone.

FIG. 6 shows three different viewpoints 600-604 of the target object, the mobile phone. Each viewpoint 600-604 may represent a different viewpoint that a device may capture in a video. For example, a user may wish to capture a plurality of views of the mobile phone shown in FIG. 6 to send to another person to view. Within FIG. 6, at view 600, the mobile phone is shown facing forward. A device may point a camera towards the front of the mobile phone to capture the front view. In addition, the handheld device may be moved to capture the mobile phone in the video from other views. In view 602, the device may capture the back of the mobile phone. Similarly, view 604 of FIG. 6 shows the mobile device at another angle.

While capturing the different viewpoints of the mobile phone, a user may move a device with a camera around the mobile phone while recording a video of the object. Different algorithms or effects may be applied to the video to generate an aligned video that captures images of the mobile phone in approximately matching images throughout different frames. For example, the device or another entity may scale or selectively determine different frames within the video to generate a more aligned video that is capable of being viewed in a rotatable manner by a user.

Figure 7:
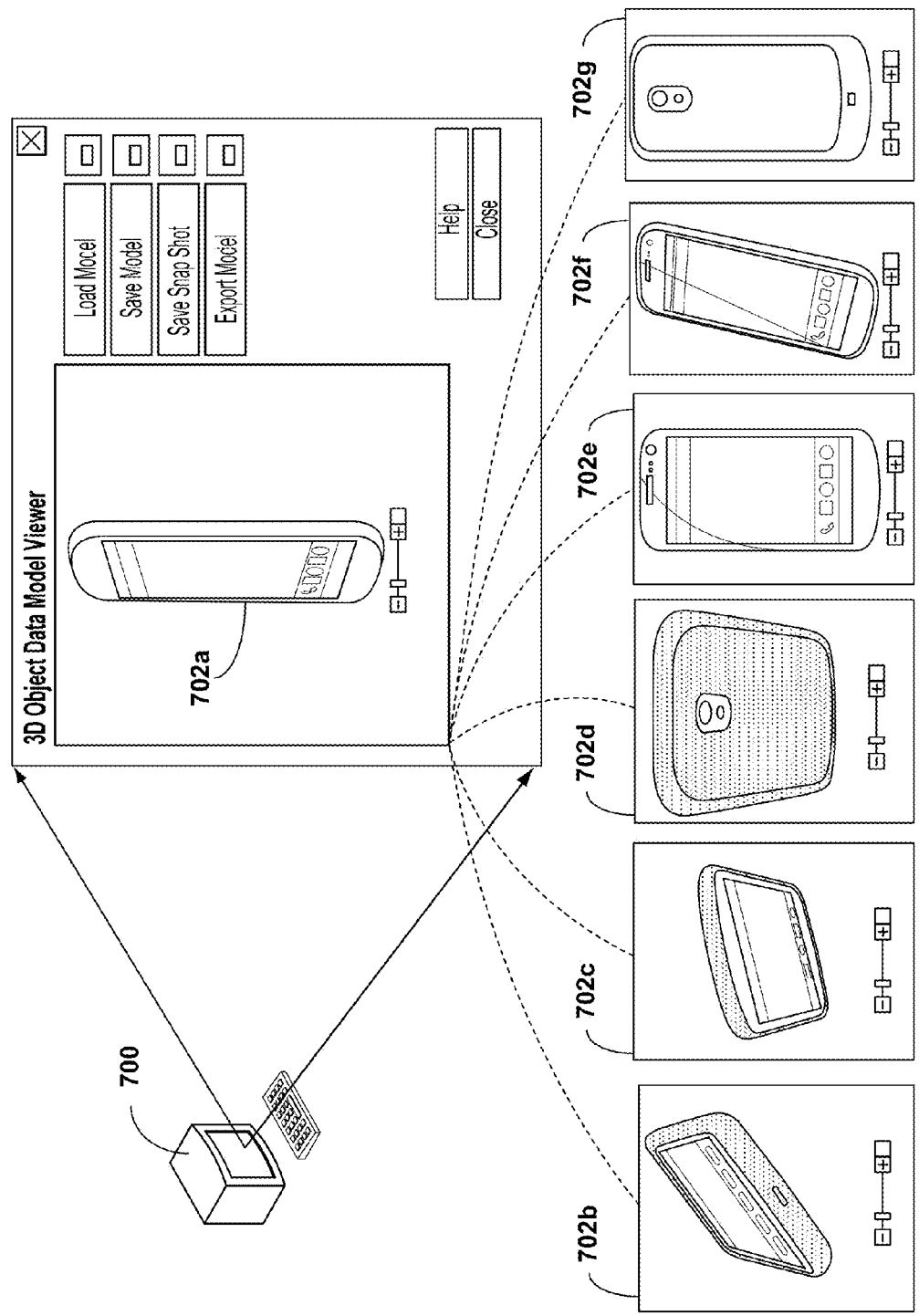
FIG. 7 illustrates an example device that may be used to display the target object in a rotatable manner.

FIG. 7 shows an example device that may be used to display the target object in a rotatable manner. In the FIG. 7, a computing device 700 is used to display sampled frames of an aligned video of the mobile phone from multiple viewpoints, such as in a swivel view format. The example in FIG. 7 further comprises sampled frames 702a-702g.

The computing device 700 includes a user interface that may allow a user to scroll and switch which viewpoints of the target object that he or she would like to view. For example, a user may move a mouse or touch a touchscreen to rotate a target device, such as the mobile phone, in a manner to see all the different features and sides of the mobile phone. Other entities, including the device that captured the video of the target object, may be capable of displaying the target object in a rotatable manner similar to device 700. In addition, the computing device 700 may have received one or more aligned videos containing sampled frames configured for viewing the target in a rotatable manner from one or more devices. In some examples, a viewer, such as the computing device 700, may retrieve aligned videos and/or sampled frames from the Internet or other sources to allow a user to view a target object in a rotatable manner.

The computer device 700 may provide the different sampled frames of the mobile phone from different viewpoints. For example, a user may want to view the various hardware components of the mobile phone before purchasing the mobile phone. A user may be able to view the various sampled frames 702a-702g to view the mobile phone from different viewpoints. The sampled frames 702a-702g may be part of an aligned video that a device or entity may generate based off a video of the target object. Each sampled frame 702a-702g may be capable of being loaded, shown, saved as a model, saved as a snap shot, downloaded/exported, scaled, or other features, for example. The different sampled frames 702a-702g may be capable of being switched between in real-time to simulate the user viewing the target object in person.

Further, the sampled frames 702a-702g may be a subset of a greater set of frames that a user may view. The sampled frames 702a-702g may be capable of overlapping to allow a user to view all the various points of the mobile phone in a smooth motion. The sample frames may be connected in a logical manner that allows the viewer to display the different sides of the mobile phone as if the user was viewing the actual mobile rotating.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents to which such claims are entitled. It is also to be understood that the terminology used herein is for the purpose of describing particular examples only, and is not intended to be limiting.

The invention claimed is:

1. A method, comprising:
   receiving, at a computing system, a video of a target object, wherein the video includes a plurality of frames, and wherein the video includes content representing a plurality of images of the target object from a plurality of viewpoints;
   determining, by the computing system, one or more approximately corresponding frames of the video including content of the target object from a substantially matching viewpoint, wherein a first of the one or more approximately corresponding frames is from a first portion of the video and a second of the one or more approximately corresponding frames is from another portion of the video;
   aligning the one or more approximately corresponding frames of the video to generate an aligned video;
   sampling, by the computing system, frames of the aligned video to select frames from multiple viewpoints of the plurality of viewpoints; and
   providing, by the computing system, the sampled frames configured for viewing the target object in a swivel view format that enables an aligned and continuous view of the target object from the plurality of viewpoints in a rotatable manner.

2. The method of claim 1, wherein receiving the video comprises receiving the video from a mobile device configured for handheld use.

3. The method of claim 1, wherein the plurality of viewpoints include one or more viewpoints from circling 360 degrees around the target object.

4. The method of claim 1, wherein sampling frames of the aligned video to select frames from multiple viewpoints of the plurality of viewpoints comprises selecting frames at approximately evenly spaced degrees of rotation from the plurality of viewpoints.

5. The method of claim 1, further comprising providing the sampled frames configured for viewing such that a view of the target object is based on a received input to a viewer.

6. The method of claim 1, further comprising:
   determining one or more feature points of the target object in the plurality of frames, wherein the one or more feature points include distinct pixels capable of being tracked across the plurality of frames; and based on an amount of movement of the one or more feature points across the plurality of frames, determining one or more transformation parameters applicable to adjust the video to be substantially focused on the target object.

7. A non-transitory computer readable medium having stored therein instructions executable by a computing device to cause the computing device to perform functions, the functions comprising:
receiving a video of a target object, wherein the video includes a plurality of frames, and wherein the video includes content representing a plurality of images of the target object from a plurality of viewpoints;
determining one or more approximately corresponding frames of the video including content of the target object from a substantially matching viewpoint, wherein a first of the one or more approximately corresponding frames is from a first portion of the video and a second of the one or more approximately corresponding frames is from another portion of the video;
aligning the one or more approximately corresponding frames of the video to generate an aligned video;
sampling frames of the aligned video to select frames from multiple viewpoints of the plurality of viewpoints; and
providing the sampled frames configured for viewing the target object in a swivel view format that enables an aligned and continuous view of the target object from the plurality of viewpoints in a rotatable manner.

8. The non-transitory computer readable medium of claim 7, wherein the functions further comprise receiving the video from a mobile device configured for handheld use.

9. The non-transitory computer readable medium of claim 7, wherein the plurality of viewpoints include one or more viewpoints from about 360 degrees around the target object.

10. The non-transitory computer readable medium of claim 7, wherein the function of sampling frames of the aligned video to select frames from multiple viewpoints of the plurality of viewpoints further comprises selecting frames at approximately evenly spaced degrees of rotation from the plurality of viewpoints.

11. The non-transitory computer readable medium of claim 7, wherein the functions further comprise providing the sampled frames configured for viewing such that a view of the target object is based on a received input to a viewer.

12. The non-transitory computer readable medium of claim 7, wherein the functions further comprise:
determining one or more feature points of the target object in the plurality of frames, wherein the one or more feature points include distinct pixels capable of being tracked across the plurality of frames; and
based on an amount of movement of the one or more feature points across the plurality of frames, determining one or more transformation parameters applicable to adjust the video to be substantially focused on the target object.

13. A system, comprising:
at least one processor; and
data storage comprising program instructions executable by the at least one processor to cause the at least one processor to perform functions comprising:
receiving a video of a target object, wherein the video includes a plurality of frames, and wherein the video includes content representing a plurality of images of the target object from a plurality of viewpoints;
determining one or more approximately corresponding frames of the video including content of the target object from a substantially matching viewpoint, wherein a first of the one or more approximately corresponding frames is from a first portion of the video and a second of the one or more approximately corresponding frames is from another portion of the video;
aligning the one or more approximately corresponding frames of the video to generate an aligned video;
sampling frames of the aligned video to select frames from multiple viewpoints of the plurality of viewpoints; and
providing the sampled frames configured for viewing the target object in a swivel view format that enables an aligned and continuous view of the target object from the plurality of viewpoints in a rotatable manner.

14. The system of claim 13, wherein the functions further comprise receiving the video from a mobile telephone that includes a camera and processor configured for obtaining video content.

15. The system of claim 13, wherein the plurality of viewpoints include one or more viewpoints from circling 360 degrees around the target object.

16. The system of claim 13, wherein the function of sampling frames of the aligned video to select frames from multiple viewpoints of the plurality of viewpoints comprises selecting frames at approximately evenly spaced degrees of rotation from the plurality of viewpoints.

17. The system of claim 13, wherein the functions further comprise providing the sampled frames configured for viewing such that a view of the target object is based on a received input to a viewer.

18. The system of claim 13, wherein the functions further comprise:
determining one or more feature points of the target object in the plurality of frames, wherein the one or more feature points include distinct pixels capable of being tracked across the plurality of frames; and
based on an amount of movement of the one or more feature points across the plurality of frames, determining one or more transformation parameters applicable to adjust the video to be substantially focused on the target object.

* * * * *